United States Patent [19]
Chin-Song

[11] Patent Number: 5,091,678
[45] Date of Patent: Feb. 25, 1992

[54] TABLE LAMP CONTROLLING DEVICE

[76] Inventor: Chen Chin-Song, No. Lin 7, Alley 6, Lane 180, Pin Chiang St., Taipei, Taiwan

[21] Appl. No.: 561,435

[22] Filed: Aug. 1, 1990

[51] Int. Cl.$^5$ .............................. H05B 41/18
[52] U.S. Cl. .................... 315/362; 315/315; 315/307; 362/395
[58] Field of Search ............... 315/362, 313, 315, 307, 315/291, 290 R; 362/394, 395, 411

[56] References Cited

U.S. PATENT DOCUMENTS 2,070,683  2/1937  Price ................................ 362/394
3,970,893  7/1976  Bryant ........................... 315/315 X Primary Examiner—Eugene R. LaRoche
Assistant Examiner—Ali Neyzari
Attorney, Agent, or Firm—Lowe, Price, LeBlanc & Becker

[57] ABSTRACT

A table lamp controlling device comprising a power controller controlled by a scanner, which detects signal input, to produce a signal output for driving a starter, via a mercury switch, to increase or reduce the intensity of light of the lamp or to cut off power supply to the lamp according to the value of signal output. The mercury switch cuts off the connection between the power controller and the starter to turn off power supply once the lamp falls from its standing position. Timer is connected to the power controller for the control. Indicator lamp is turned on once the signal output from the power controller is cleared.

11 Claims, 2 Drawing Sheets

TABLE LAMP CONTROLLING DEVICE

BACKGROUND OF THE INVENTION

The present invention relates to a structure of table lamp controlling device which controls the intensity of light and automatically cuts off power supply once the table lamp falls from its standing position.

Regular table lamp control switches are generally defined for power control, light intensity control, or for the both. In recent years, the design of switch has been greatly improved and touch-control switch has been widely used. However, regular touch-control switch for table lamp control does not provide any protection once a table lamp falls from its standing position which may cause disaster. The present invention is to design such a table lamp controlling device which can eliminate this problem.

SUMMARY OF THE INVENTION

According to a first aspect of the present invention, a table lamp controlling device comprises a scanner which detects signal input through a control panel and provides a signal output according to detected signal input so as to control the intensity of light through a starter.

According to a second aspect of the present invention, a table lamp controlling device comprises a mercury switch connected between a power controller and a starter. The mercury switch automatically cuts off the output from the power controller, once the table lamp is not in a normal position, so as to turn off power supply for protection. Once the table lamp is turned to normal position, the mercury switch is automatically connected to turn on the table lamp.

According to a third aspect of the present invention, a table lamp controlling device comprises a timer connected to a power controller to clear the signal output of a power controller according to its setting, so as to automatically turn off a table lamp as scheduled.

According to a fourth aspect of the present invention, a table lamp controlling device comprises an indicator lamp connected to a power controller, which is automatically turned on for indication once a table lamp is turned off.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
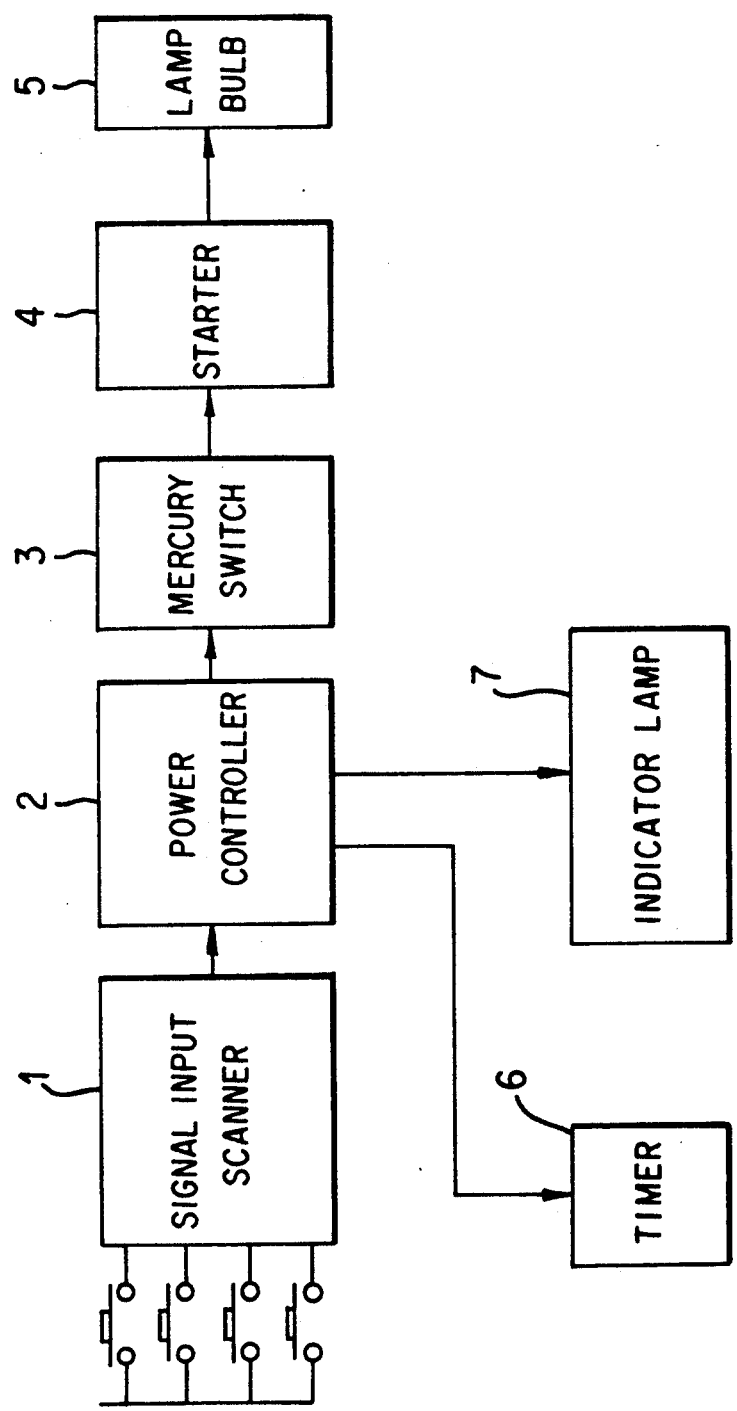
FIG. 1 is a system block diagram according to the present invention.

FIG. 1 illustrates a system block diagram according to the present invention. Signal input scanner 1 detects signal input through signal input control panel, to drive power controller 2 to provide starter 4 with a light intensity control value according to signal input via mercury switch 3, permitting starter 4 to provide suitable power rating to the circuit of lamp bulb 5. When table lamp is shaking severely or comes down from a standing position, light intensity control value is stopped by mercury switch 3 from sending to starter 4 and lamp bulb 5 is simultaneously turned off. As soon as mercury switch 3 is turned to normal position, the light intensity control value from power controller 2 is permitted to pass through mercury switch 3 to starter 4 for turning on lamp bulb 5. Timer 6 is separately connected to power controller 2 to clear output of light intensity control value from power controller 2, once a predetermined period of time is up, so as to turn off lamp bulb 5 according to setting. Indicator lamp 7 is also connected to power controller 2 for on/off indication of lamp bulb 5.

Figure 2:
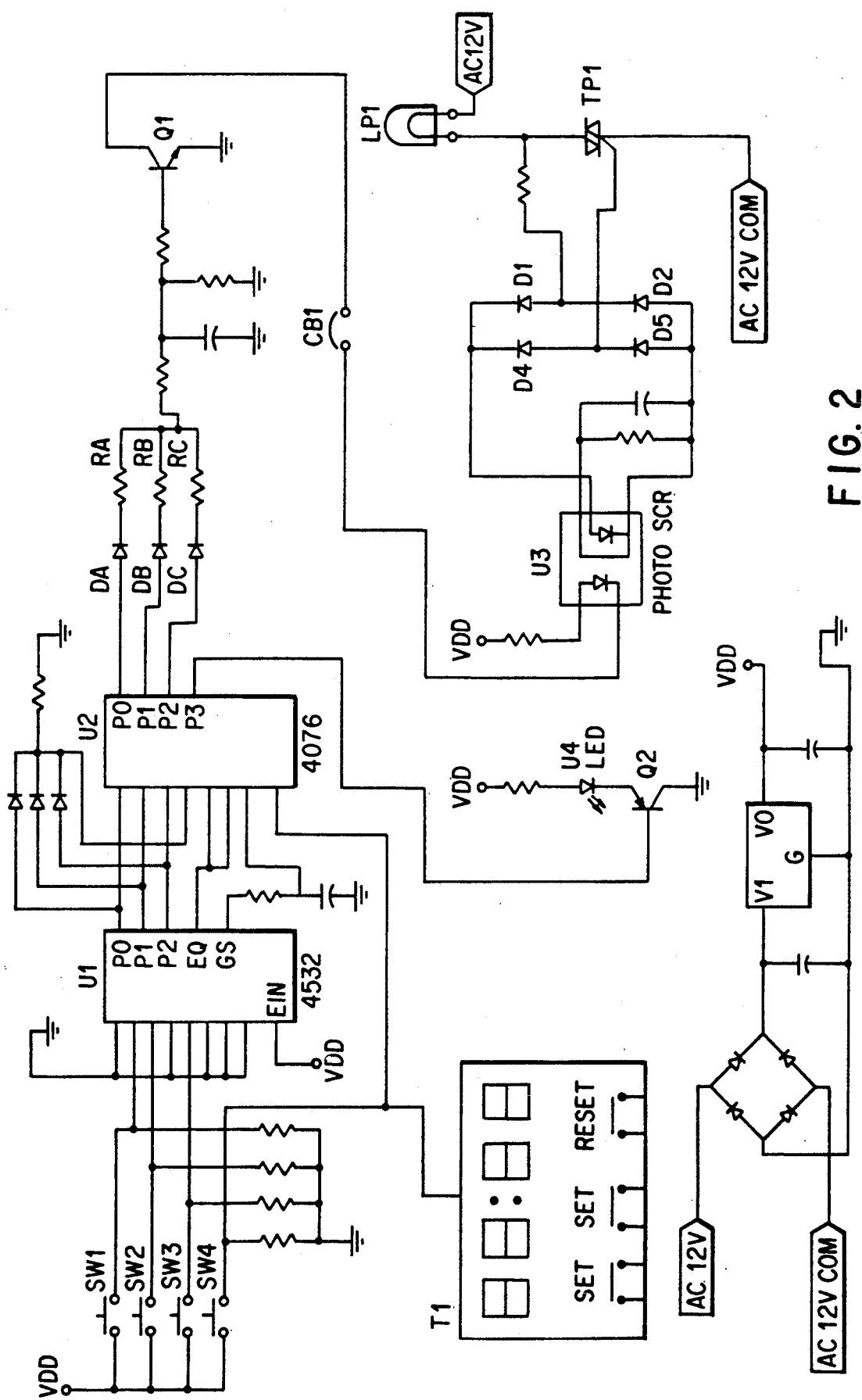
FIG. 2 is a circuit diagram of the preferred embodiment of the present invention.

FIG. 2 illustrates a circuit diagram of the preferred embodiment of the present invention. IC4532 (U1) is a signal input scanner to detect SW1 (high), SW2 (medium), SW3 (low). Either switch is touched, a corresponding signal input is produced to drive U1 to provide a corresponding signal output, through either one of its pins P0, P1 or P2, to power controller which is consisted of IC4076 (U2), diodes DA, DB, DC, resistors RA, RB, RC, and transistor Q1. Upon receipt of output signal from U1, a corresponding signal is produced by U2 for output through either one of its pins P0-P2 to send to Q1 via DA, RA; DB, RB, DC, RC so as to drive transistor Q1 to produce collector current according to the resistance of RA, RB or RC, which collector current is a light intensity control value for controlling the intensity of light. Light intensity control value from transistor Q1 is further sent through mercury switch CB1 to starter which is comprised of SCR (U3), bridge rectifier (D1, D2, D4, D5) and TRIAC (TP1). The higher the light intensity control value (collector current of transistor Q1), the lower the voltage is required to connect SCR (U3) and the faster the speed in connecting SCR (U3). Therefore, higher light intensity control value permits much power to pass through bridge rectifier and TP1 to increase the intensity of light produced by lamp bulb (LP1). Through the afore-said operation, the intensity of light of a connected lamp bulb can be conveniently controlled.

In the present preferred embodiment, mercury switch CB1 is to control the connection of power to transistor Q1. It may be, as an alternate form of the present invention, replaced with a level switch. Once table lamp falls from its standing position, mercury inside mercury switch CB1 moves away from connecting point to cut off the connection between two poles, so as to simultaneously cut off collector current at transistor Q1. Once mercury switch CB1 is turned to a normal position, its two poles are immediately connected so that collector current of same value at Q1 is returned to normal for turning on the connected lamp bulb to produce same intensity of light.

Timer T1 has an output end connected with SW4 (Off-control) to U2 at pin for reset. Once SW4 is touched or a pre-setting time through T1 is up, U2 is immediately reset and the output through pins P0-P2 becomes zero. Therefore, collector current at Q1 is disappeared, and lamp bulb is turned off.

U2 further comprises an additional pin P3 controlled by the output through U1. Signal output through either pin P0-P2 of U2 (for turning on lamp bulb) simultaneously drives pin P3 to provide an output. When U2 is reset, pins P0-P2 and P3 of U2 are simultaneously cleared, and transistor Q2 is connected to turn on LED (U4) for the indication of off-mode of the connected lamp bulb.

I claim:

1. A table lamp controlling device, comprising:

a scanner for detecting a control signal input through a signal input control panel;

a power controller controlled by said scanner to provide a lamp intensity signal output;

a lamp power supply connected to said power controller through a mercury switch attached to said table lamp to control the intensity of light of a table lamp connected thereto in response to said lamp intensity signal output from said power controller;

a timer connected to said power controller to automatically clear said lamp intensity signal output from said power controller upon expiration of a predetermined time period;

an indicator lamp connected to said power controller, said indicator lamp turned on in response to clearance of the lamp intensity signal output from said power controller;

wherein said mercury switch is normally connected to permit said lamp intensity signal output from said power controller to pass therethrough to drive said lamp power supply to turn on said table lamp; and wherein said mercury switch is switched off when said table lamp falls from its standing position, to interrupt said lamp intensity signal from being received by said lamp power supply so as to turn off said lamp power supply.

2. The table lamp controlling device of claim 1, wherein said mercury switch comprises a level switch.

3. The table lamp controlling device of claim 1, wherein said timer clears said output from said power controller substantially instantaneously upon expiration of said predetermined time period whereby said lamp power supply is responsive to said control signal from said signal input control panel prior to expiration of said predetermined time period for adjusting an intensity of said table lamp.

4. A table lamp safety controlling device for controlling an intensity of a table lamp and automatically turning said table lamp off when said table lamp is positionally disturbed, comprising:

lamp intensity adjusting means for supplying a lamp intensity signal;

lamp position switching means including a mercury switch receiving said lamp intensity signal and, in response to detecting a normal operating orientation of said table lamp, supplying said lamp intensity signal and, in response to detecting a nonoperating orientation of said table lamp, interrupting said lamp intensity signal;

lamp power supply means responsive to said lamp intensity signal from said lamp position switching means for supplying power to said table lamp whereby an intensity of said table lamp is controlled by said lamp intensity adjusting means when said table lamp is oriented in said normal operating orientation and no power is supplied to said table lamp when in said nonoperating orientation;

an indicator device receiving said lamp intensity signal for indicating a status thereof; and timer means for automatically interrupting said power supply to said table lamp in response to a lapse of a predetermined time period to turn said table lamp off.

5. The table lamp safety controlling device according to claim 4 wherein said lamp power supply means includes an optical isolation device receiving said lamp intensity signal from said lamp position switching means and, in response provides a power control signal for controlling said power supply supplied to said table lamp.

6. The table lamp safety controlling device according to claim 4, wherein said lamp intensity adjusting means includes a plurality of manually operable switches and lamp intensity signal setting means responsive to said switches for supplying said lamp intensity signal whereby a level of said power supply supplied to said table lamp is controlled to operate said table lamp at two different illumination intensities and to turn said table lamp off.

7. The table lamp safety controlling device according to claim 6 wherein said lamp intensity adjusting means includes control signal supplying means for generating said lamp intensity signal having a voltage level responsive to said manually operable switches.

8. A table light, comprising:

a lamp for providing illumination;

manually adjustable lamp intensity adjusting means for supplying a lamp intensity signal;

lamp position switching means including a mercury switch commonly mounted with said lamp for detecting an orientation thereof, said lamp position switching means receiving said lamp intensity signal and, in response to detecting a normal operating orientation of said lamp, supplying said lamp intensity signal and, in response to detecting a nonoperating orientation of said lamp, interrupting said lamp intensity signal;

lamp power supply means responsive to said lamp intensity signal from said lamp position switching means for supplying power to said lamp whereby an intensity of said lamp is controlled by said lamp intensity adjusting means when said lamp is oriented in said normal operating orientation and no power is supplied to said lamp when in said nonoperating orientation;

an indicator device receiving said lamp intensity signal for indicating a status thereof; and timer means for automatically interrupting said power supply to said lamp in response to a lapse of a predetermined time period to turn said lamp off.

9. The table light according to claim 8 wherein said lamp power supply means includes an optical isolation device receiving said lamp intensity signal from said lamp position switching means and, in response provides a power control signal for controlling said power supply supplied to said lamp.

10. The table light according to claim 8, wherein said lamp intensity adjusting means includes a plurality of manually operable switches and lamp intensity signal setting means responsive to said switches for supplying said lamp intensity signal whereby a level of said power supply supplied to said lamp is controlled to operate said lamp at two different illumination intensities and to turn said lamp off.

11. The table light according to claim 10 wherein said lamp intensity adjusting means includes control signal supplying means for generating said lamp intensity signal having a voltage level responsive to said manually operable switches.

* * * * *